(12) United States Patent
Furumura

(10) Patent No.: US 8,188,924 B2
(45) Date of Patent: *May 29, 2012

(54) RF POWDER AND METHOD FOR MANUFACTURING THE SAME

(75) Inventor: Yuji Furumura, Yokohama (JP)

(73) Assignee: Philtech Inc., Tokyo (JP)

( * ) Notice: Subject to any disclaimer, the term of this patent is extended or adjusted under 35 U.S.C. 154(b) by 318 days.

This patent is subject to a terminal disclaimer.

(21) Appl. No.: 12/153,661

(22) Filed: May 22, 2008

(65) Prior Publication Data

US 2009/0289228 A1 Nov. 26, 2009

(51) Int. Cl.
*H01Q 1/38* (2006.01)
(52) U.S. Cl. ................................. 343/700 MS
(58) Field of Classification Search ........... 343/700 MS; 252/500; 427/96.1
See application file for complete search history.

(56) References Cited

U.S. PATENT DOCUMENTS

| | | | |
|---|---|---|---|
| 3,713,148 A | 1/1973 | Cardullo et al. | |
| 5,528,222 A | 6/1996 | Moskowitz et al. | |
| 5,581,257 A | 12/1996 | Greene et al. | |
| 6,517,900 B1 | 2/2003 | Pierre | |
| 7,508,305 B2 | 3/2009 | Yamazaki et al. | |
| 7,667,310 B2 | 2/2010 | Dozen et al. | |
| 7,683,838 B2 | 3/2010 | Koyama et al. | |
| 7,764,174 B2 | 7/2010 | Rodgers | |
| 7,799,147 B2 * | 9/2010 | Matsukawa et al. | 148/307 |
| 2008/0224937 A1 * | 9/2008 | Kimura et al. | 343/787 |
| 2008/0231445 A1 | 9/2008 | Rodgers | |
| 2010/0067166 A1 | 3/2010 | Furumura et al. | |
| 2010/0071746 A1 | 3/2010 | Furumura et al. | |
| 2010/0081235 A1 | 4/2010 | Furumura | |
| 2010/0090925 A1 | 4/2010 | Furumura et al. | |

FOREIGN PATENT DOCUMENTS

| | | |
|---|---|---|
| JP | 05151428 A | 6/1993 |
| JP | 10-171951 | 6/1998 |
| JP | 2001176899 A | 6/2001 |
| JP | 2001266097 A | 9/2001 |

(Continued)

OTHER PUBLICATIONS

Chen, Liu, Thermal Modeling for System-in-a-Package Based on Embedded Chip Structure, Oct. 2005, Polymers and Adhesives in Microelectronics and Photonics, Pllytronic, 2005, 5th International Conference, pp. 224-227.

(Continued)

*Primary Examiner* — Hoang V Nguyen
(74) *Attorney, Agent, or Firm* — Maschoff Gilmore & Israelsen

(57) ABSTRACT

The present invention provides an RF powder having a characteristic to be used as a powder (powdery substance) which is composed of a large quantity of particles and has a collective form, wherein each of a large quantity of particles composing the powder is smaller in size as compared with a current IC tag chip and is used as a device having a function substantially equivalent to the IC tag chip, use form thereof is not individual device use but powder use, treatment is easy, a manufacturing cost is very low in respect of a unit cost of each particle, and a practical use is very high, and a method for manufacturing the same. An RF powder 11 is used in a powder form, wherein each particle 11a in the powder has an integrated circuit 13 formed on a substrate 12, an insulating layer 14 formed on the integrated circuit, and an antenna element 15 formed on the insulating layer.

7 Claims, 8 Drawing Sheets

FOREIGN PATENT DOCUMENTS

| | | | |
|---|---|---|---|
| JP | 2002329684 | A | 11/2002 |
| JP | 2003179005 | | 6/2003 |
| JP | 2004078991 | A | 3/2004 |
| JP | 2005203751 | A | 7/2005 |
| JP | 2005209104 | A | 8/2005 |
| JP | 2005242629 | A | 9/2005 |
| JP | 2005252242 | A | 9/2005 |
| JP | 2007128433 | A | 5/2007 |
| JP | 2007128434 | A | 5/2007 |
| JP | 2008134694 | A | 6/2008 |
| JP | 2008134816 | A | 6/2008 |
| JP | 2008135446 | A | 6/2008 |
| JP | 2008135951 | A | 6/2008 |

OTHER PUBLICATIONS

Daily, Linda, Hitachi Researchers Develop Powder-Sized RFID Chips, IEEE Computer Society, May 2007, p. 23.

Miller, Paul, Mitachi's RFID powder freaks us the heck out, Feb. 14, 2007, http:/www.engadget.com/2007/02/14/hitachix-rfid-powder-freaks-us-the-heck-out.

Mura et al., RF-Powder: Fabrication of 0.15 mm-Si-powder Resonating at Microwave Frequncies, Microwave Conference (Proceedings of the 37th European Microwane Conference), Oct. 2007, Munich, Germany, pp. 392-395.

Usami, Mitsuo, An Ultra-Small RFID Chip: mu chip, 2004 IEEE Asia Pacific Conference on Advanced System Integrated Circuits(AP-ASIC2004) Aug. 4-5, 2004 pp. 2-5.

Usami, Mitsuo, "The μ-Chip, an Ultra-Small 2.45 GHz RFID Chip for Ubiquitous Recognition Applications," Applied Physics, 2004, p. 1179-1183, vol. 73, No. 9, Japan.

Yoshiko, Hara, Hitachi advances paper-thin RFID chip, Feb. 6, 2006 EETimes News & Analysis.

Office Action dated Jan. 11, 2011 as received in related U.S. Appl. No. 12/153,662.

Office Action dated Jul. 29, 2010 as received in related U.S. Appl. No. 12/153,662.

12153662 Office Action mailed Jun. 10, 2011.

Nakamoto, Hiroyuki, A PassiveUHF RF Identification CMOS Tag IC Using Ferroelectric RAM in 0.35.

Paulson, "Hitachi Researchers Develop Powder-Sized RFID Chips," IEEE Computer Society, May 2007, p. 23.

Usami et al., "An SOI-Based 7.5 μm-Thick 0.15x0.15 mm sq RFID Chip," 2006 IEEE International Solid-State Circuits Conference, 10 pages.

Kamal Sarabandi, "Compact Reconfigurable HF-UHF Antennas," Jun. 7, 2004, http://www.stormingmedia.us/61/6100/A610034.html.

Tetsuo Nozawa, "Hitachi Achieves 0.05-mm Square Super Micro RFID Tag, 'Further Size Reductions in Mind'," Tech-On Nikkei Business Publications, Feb. 20, 2007, http://techon.nikkeibp.co.jp/english/NEWS_EN/20070220/127959/.

* cited by examiner

RF POWDER AND METHOD FOR MANUFACTURING THE SAME

BACKGROUND OF THE INVENTION

1. Field of the Invention

The present invention relates to a radio-frequency (RF) powder and a method for manufacturing the same and in particular to, an RF powder which is used as a powder and is made to be contained in paper or the like to thereby allow information or the like to be read by a radio-frequency electromagnetic field (radio wave) given from the outside, and a method for manufacturing the same.

2. Description of Related Art

Currently, it is considered that integrated circuit (IC) tags are products indicating the beginning of the ubiquitous age. Labels, Suica cards, FeRAM cards, or the like have been developed previously as RF-ID (micro radio identification). Many people expect that the IC tag market will certainly grow larger in the future. However, the market has not grown enough as expected. The reason is that there are problems such as cost, security, and privacy other than technologies, which must be solved socially.

The cost of the IC tag can be reduced by reducing the size of the IC tag chip. It is because the number of IC tag chips obtained from one wafer can be increased if the size of the IC tag chips is reduced. At present, an IC tag chip of 0.4 millimeters square has been developed. This IC tag chip can read 128-bit memory data in the chip with a microwave of 2.45 GHz (for example, refer to Non-patent Document 1).

According to a conventional manufacturing method, however, there have been problems described below when the micro IC tag chips are manufactured from one wafer.

The conventional method for manufacturing the IC tag chips are described in a section of BACKGROUND ART in, for example, Patent Document 1. According to the manufacturing method, a wafer in which ICs are formed on a front surface is subjected to a back grinding process, and a back surface of the wafer is polished to reduce a thickness of the wafer. After that, the wafer is subjected to a dicing process to separate a large number of IC tag chips with a predetermined shape. In the dicing process, the wafer is cut with a dicing saw to be separated into a large number of IC tag chips. With the separation method for cutting the wafer along dicing lines with the dicing saw, wafer areas, such as considerable areas used for the cutting, areas influenced by the cutting process, and the like, cannot be used for manufacturing the IC tag chips. Furthermore, the smaller the IC tag chips become, the further increases the number of dicing lines, and thus a ratio of unusable area to the whole wafer is increased, thereby making it impossible to use the wafer effectively. Namely, the number of IC tag chips which can be cut out from one wafer is decreased.

For that reason, a new method for separating semiconductor devices is proposed in order so solve the above-described problems in Patent Document 1. According to the method for separating the semiconductor devices in Patent Document 1, half cuts are formed by etching the separating positions for separating the semiconductor devices, from a front surface of the wafer on which circuits are formed; a tape material is adhesively attached on the front surface of the wafer; a back surface of the wafer is then mechanically polished by only a predetermined thickness while leaving a remaining portion so as not to communicate with the half cutting on the front surface; etching or chemical mechanical polishing is performed from the back surface of the wafer; and the wafer is finally separated into individual semiconductor devices. Since the half cut is formed by etching as described above, cut-out portions can be reduced while a width of the half cutting can also be narrowed, and thus allowing the number of the semiconductor devices obtained from one wafer to be increased.

Patent Document 1: Japanese Unexamined Patent Publication (Kokai) No. 2003-179005

Non-patent Document 1: "Micro radio IC tag chip "μ-chip"" by mitsuo Usami in Applied Physics, Vol. 73, No. 9, 2004, p. 1179-p. 1183

SUMMARY OF THE INVENTION

Problem to be Solved by the Invention

The IC tag chips disclosed in Non-patent Document 1 are essentially semiconductor devices to be treated individually. However, since the IC tag chips are typically micro semiconductor devices of approximately 0.4 millimeters, to treat them individually is not easy in practical treatment. Furthermore, the cost is expensive.

Meanwhile, according to the method for separating the semiconductor devices proposed in Patent Document 1, when the RF powder which includes a large quantity of micro semiconductor devices of not more than 0.4 millimeters square are manufactured, it is very difficult to uniformly apply a protection film to each of the very fine semiconductor devices which are particles, after separating the wafer to thereby manufacture a large quantity of semiconductor devices.

Note herein that the above-described "RF powder" means a powder, in which each of a large quantity of particles composing the powder (powdery substance or powder particulate matter) has an electrical circuit element for transmitting/receiving signals (information) with an external reader/writer device via radio waves (radio-frequency electromagnetic field), and a normal use form is a collective form.

In view of the above-described problems, it is an object of the present invention to provide an RF powder having a characteristic to be used as a powder (powdery substance) which is composed of a large quantity of particles and has a collective form, wherein each of a large quantity of particles composing the powder is smaller in size as compared with a current IC tag chip and is used as a device having a function substantially equivalent to the IC tag chip, the use form is not individual device use but it is used as powder, the treatment is easy, the manufacturing cost is very low in respect of a unit cost of each particle, and the practical use is very high; and a method for manufacturing the sane.

Means for Solving Problem

In order to achieve the above-described object, an RF powder and a method for manufacturing the same according to the present invention are configured as follows.

A first RF powder is used in a powder form, wherein each particle of the powder has an integrated circuit formed on a substrate, an insulating layer formed on the integrated circuit, and an antenna element formed on the insulating layer.

The above-described RF powder is not treated with a concept of individual IC chips but is always used and managed collectively as the powder (powdery substance), and thus a plurality of particles are simultaneously used in use. The plurality of particles include integrated circuit elements, respectively, each having a function for transmitting/receiving required information between the particle and the external reader/writer via a radio-frequency electromagnetic field.

A second RF powder is used in a powder form, wherein each particle of the powder is formed on a substrate and has a resonator responsive to an external electromagnetic field. In this configuration, each particle of the RF powder does not have the integrated circuit element but has a function for transmitting/receiving required information by the resonator responsive to the external radio-frequency electromagnetic field.

A third RF powder in the above-described configuration is characterized in that the resonator is an antenna element formed on the substrate or an antenna element formed on an insulating layer on the substrate.

A fourth RF powder in the above-described RF powder is characterized in that each particle of the powder is used to be mixed into a medium without inspection.

Further, a fifth RF powder in the above-described RF powder is characterized in that each particle of the powder is stored and managed in a container in a powder state.

A sixth RF powder in the above-described each RF powder is characterized in that a size of a rectangular plane including the longest side of the particle is preferably not less than 0.05 millimeters square and not more than 0.30 millimeters square.

A seventh RF powder in the above-described third RF powder is characterized in that the size of the rectangular plane including the longest side of the particle is preferably 0.15 millimeters square.

A method for manufacturing a first RF powder is a method for manufacturing an RF powder composed of a large quantity of particles, wherein a single particle thereof has an integrated circuit formed on a substrate, an insulating layer formed on the integrated circuit, and an antenna element formed on the insulating layer, the method including: a step of forming a large quantity of integrated circuit elements with antenna to be the particles, on a wafer using exposure by parallel rays or an X-ray; a gas dicing process of forming cut grooves in positions for separating the integrated circuit elements with antenna on a surface in the wafer on which the antenna elements are formed; a protection film forming process of covering with a protection film the circumference of the integrated circuit elements with antenna; a strengthening process of pasting a strengthening plate with an adhesive on a surface of the wafer on which the protection film is formed; a polishing process of polishing a back surface of the wafer up to the cut grooves; and a separating process of removing the adhesive and removing the strengthening plate to thereby separate the integrated circuit elements with antenna.

A method for manufacturing a second RF powder is a method for manufacturing an RF powder composed of a large quantity of particles, wherein a single particle thereof has a resonance circuit which is formed on a substrate and is responsive to an external electromagnetic field, the method including: a step of forming a large quantity of circuit elements to be the particles, on a wafer using exposure by parallel rays or an X-rays; a gas dicing process of forming cut grooves in positions for separating the circuit elements on a surface of the wafer on which the resonance circuit is formed; a protection film forming process of covering with a protection film the circumference of the circuit elements; a strengthening process of pasting a strengthening plate with an adhesive on a surface of the wafer on which the protection film is formed; a polishing process of polishing a back surface of the wafer up to the cut grooves; and a separating process of removing the adhesive and removing the strengthening plate to thereby separate the circuit elements.

The method for manufacturing a third RF powder in the above-described each manufacturing method is characterized in that the adhesive is a material to be dissolved by an organic solvent. This adhesive has an adhesion function and a solidification function. The material to be dissolved by the organic solvent includes, for example, paraffin, luster, wax, or the like.

The method for manufacturing a fourth RF powder in the above-described each manufacturing method is characterized in that the strengthening plate is preferably a ceramic plate.

According to the present invention, since the particles are not individually used as the single IC tag chip but is collectively used as the RF powder, the treatment is easy and it can be manufactured at low cost. Additionally, according to the present invention, since the protection film forming process of covering with the protection film the circumference of the particle is provided before separating the wafer into the particles, the protection film can be uniformly applied to each particle.

Moreover, when the back surface of the wafer is polished as a pre-processing in order to separate the wafer into each particle of the RF powder, paraffin or the like is coated on the front surface of the wafer to past the ceramic plate thereon, and the inside of the cut groove for separation formed on the front surface of the wafer is further filled and solidified with the paraffin or the like, thus making it possible to polish the cut groove up to the bottom by mechanical polishing without causing cracks, chaps, or the like. For this reason, the whole manufacturing process of the RF powder is simplified, thus allowing the manufacturing cost to be reduced.

EXPLANATIONS OF LETTERS OR NUMERALS

Figure 1:
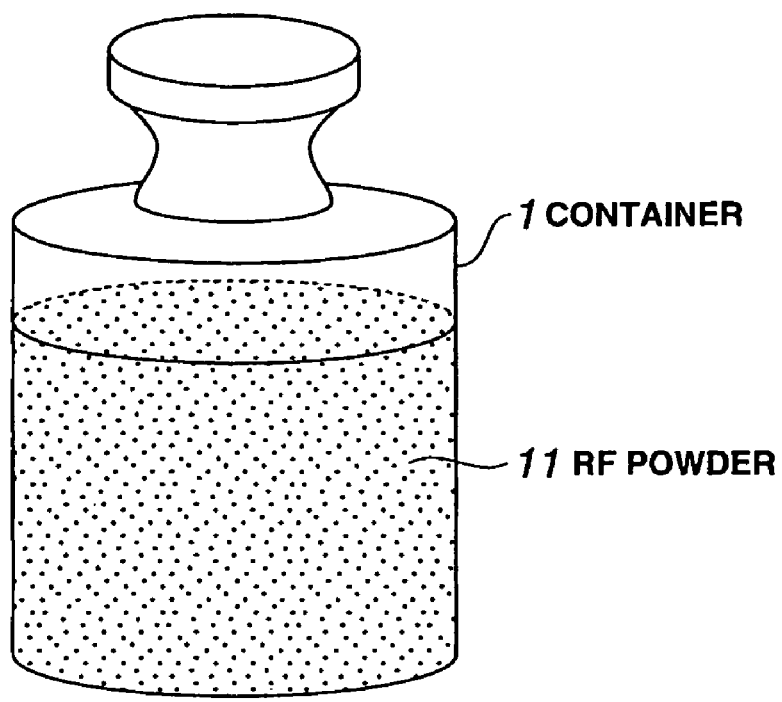
FIG. 1 is a view showing an aspect of use and management of RF powder according to a first embodiment of the present invention.

1: Container
11: RF powder

11a: Powder particle
12: Substrate
13: Integrated circuit (IC)
14: Insulating layer
15: Antenna element
16 and 17: Transistor
18 and 19: Interconnection
30: Sheet member
32: Reader/writer
39: Integrated circuit element with antenna
40: Substrate
40a: Cut groove
43: Protection film
44: Paraffin
45: Ceramic plate

DETAILED DESCRIPTION OF THE INVENTION

Hereinafter, preferred embodiments (examples) according to the present invention will be explained based on accompanying drawings.

FIGS. 1 to 6 show a first embodiment of an RF powder according to the present invention. FIG. 1 shows an aspect of use and storage management of the RF powder. FIG. 1 shows that an RF powder 11 is contained in a container 1 such as a bottle or the like. The RF powder 11 according to the present invention is always in a form of being used as a powder (powdery substance or powder particulate matter).

Figure 2:
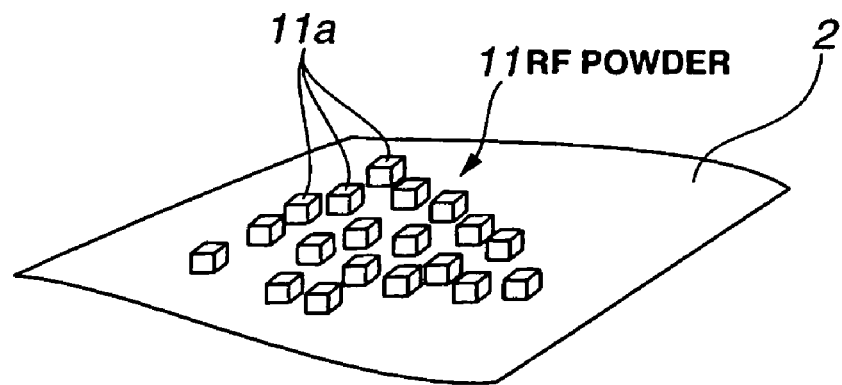
FIG. 2 is a view showing some exaggerated and enlarged powder particles taken out from the RF powder according to the first embodiment.

FIG. 2 is a view in which a plurality of particles 11a of the RF powder 11 are taken out from the container 1 and are placed on a sheet-like member 2 such as rectangular paper, and each particle 11a is enlargedly shown. In FIG. 2, a size of each particle 11a composing the RF powder 11 is exaggeratedly shown. Note that a thickness of each particle 11a on the sheet-like member 2 is shown without exaggeration. Hereinafter, the "particle 11a" will be described as a "powder particle 11a."

Figure 3:
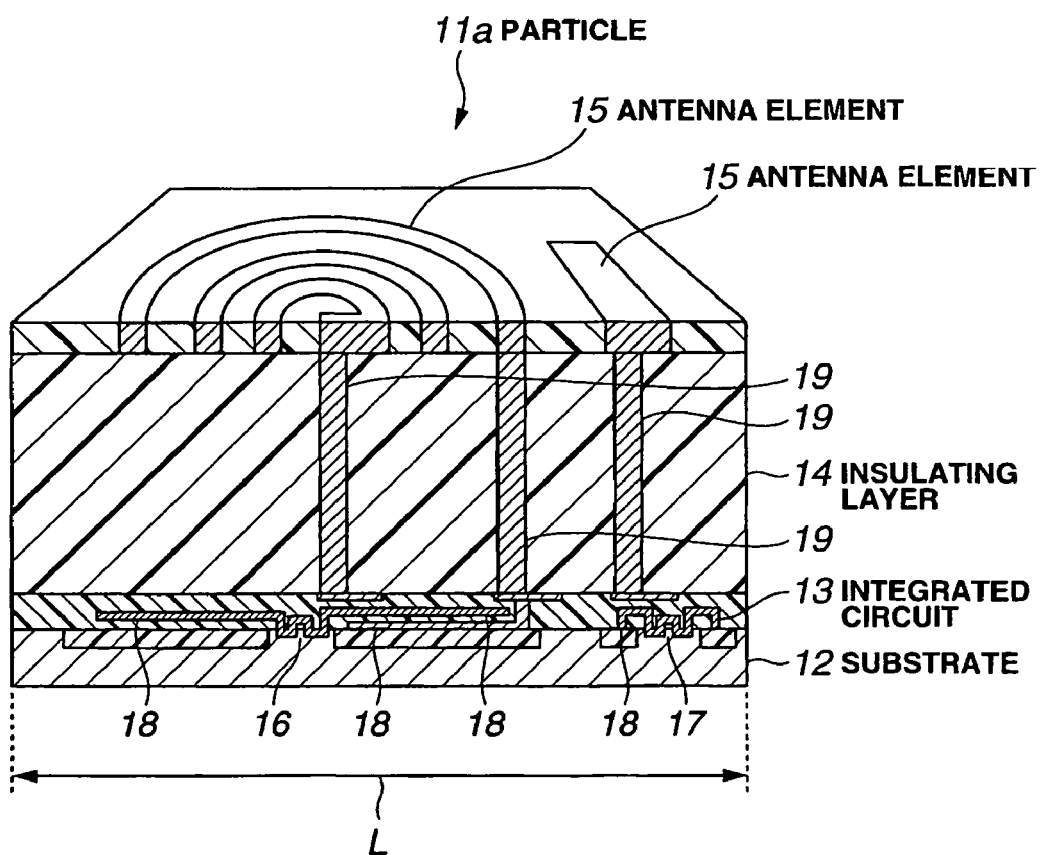
FIG. 3 is a three dimensional view showing a sectional main part of a single powder particle of the RF powder according to the first embodiment.

FIG. 3 shows a main part longitudinal section of one of the plurality of powder particles 11a shown in FIG. 2. In FIG. 3, a thickness of the powder particle 11a of the RF powder 11 is exaggeratedly shown. The powder particle 11a has a three-dimensional shape, in which with respect to a plurality of rectangular planes in outer front surfaces thereof, a size of the rectangular plane is not less than 0.05 millimeters square and not more than 0.30 millimeters square, and more preferably 0.15 millimeters square. In the powder particle 11a according to the present embodiment, a side L in the front shown in FIG. 3 is 0.15 millimeters (150 micrometers).

Each of a large quantity of powder particles 11a composing the RF powder 11 has an integrated circuit (IC) 13 provided with a memory function, such as FeRAM, formed on a substrate 12 such as silicon or the like, an insulating layer 14 with a thickness of approximately 30 micrometers formed on the integrated circuit 13, and an antenna element 15 responsive to an electromagnetic field with a specific frequency (for example, 2.45 GHz) formed on the insulating layer 14. In FIG. 3, transistors 16 and 17 which configure the integrated circuit 13, interconnections 18 connected to the transistors 16 and 17, and interconnections 19 for connecting the antenna element 15 and the integrated circuit 13 are shown as an example of electrical circuit elements. The interconnections 19 are embedded in the insulator 14.

Figure 4:
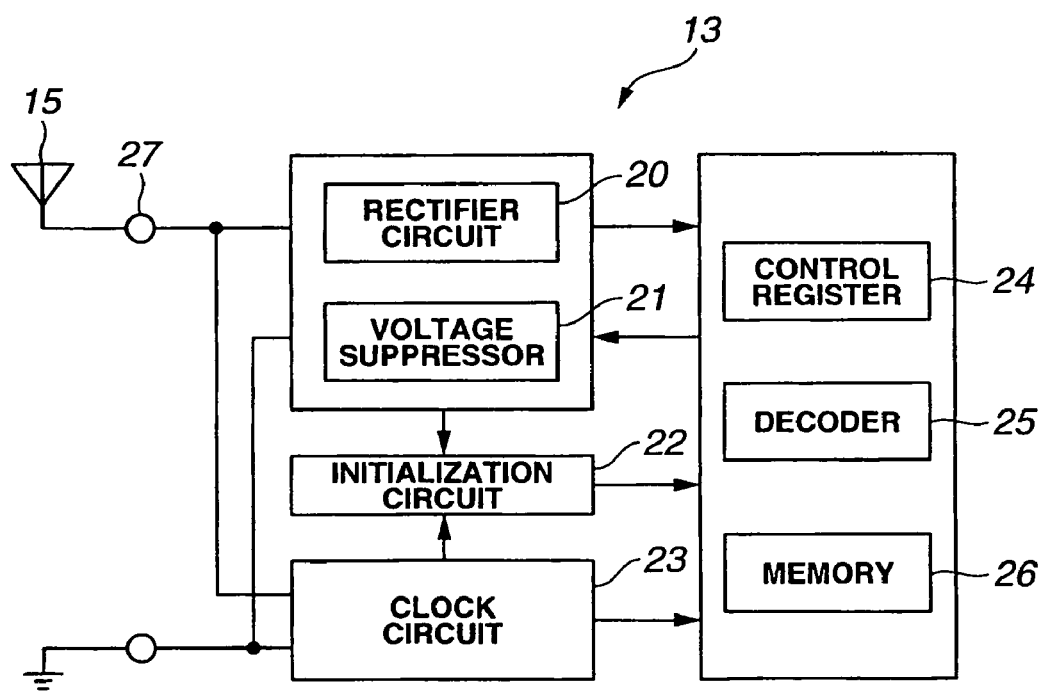
FIG. 4 is a block diagram showing an example of a circuit configuration of an integrated circuit which is contained in a single powder particle of the RF powder according to the first embodiment.

FIG. 4 shows one example of a circuit configuration of the integrated circuit 13 provided in each powder particle 11a of the RF powder 11. The integrated circuit 13 is provided with a rectifier circuit 20, a voltage suppressor 21, an initialization circuit 22, a clock circuit 23, a control register 24, a decoder 25, and a memory 26, for example. These circuit elements have following functions, respectively.

The rectifier circuit 20 has a function of rectifying radio-frequency electromagnetic waves incoming from the outside into a DC power supply voltage. For example, the 2.45 GHz electromagnetic wave which is introduced via the antenna 15 and an antenna terminal 27 is converted into a voltage for operating internal analog circuits and digital circuits by the rectifier circuit 20. When the powder particles 11a of the RF powder 11 approach a reader/writer 32 (refer to FIG. 5) and the rectifier circuit 20 generates the excessive voltage in response to excessive electromagnetic wave energy from the reader/writer 32, the voltage suppressor 21 suppresses the voltage and prevents semiconductor devices in the integrated circuit 13 from being damaged. The initialization circuit 22 controls start and end of the circuit operation and the clock circuit 23 demodulates a clock waveform. The memory 26 is, for example, an FeRAM in which identification numbers are stored. Contents in the memory 26 are selected by the control register 24 and the decoder 25 to be transmitted to the reader/writer 32.

Next, with reference to FIGS. 5 and 6, an actual use example of the RF powder 11 according to the first embodiment will be explained.

A considerable number of powder particles 11a of the RF powder 11 are made to be contained in a sheet member 30, which is a medium such as paper or the like. A thickness of the sheet member 30 is exaggeratedly and enlargedly shown in FIG. 5. When the RF powder is made to be contained in the sheet members 30 such as bills, aqueous solutions (ink, paint, or the like) filled with an adhesive fixative containing the RF powder 11 is made to soak into the sheet member 30 with a dropper or the like, for example. Thus, the RF powder 11 can be attached on a surface of the sheet member 30, or can be made to soak inside the sheet member 30. At this time, each powder particle 11a is made to soak without inspection. Namely, each powder particle 11a needs not to be particularly inspected whether it is normal or abnormal. FIG. 5 shows a state where a plurality of powder particles 11a of the RF powder 11 are made to soak inside the sheet member 30 to be arranged. Note herein that, when the powder particles 11a are mixed into the media such as paper or the like, the powder particles 11a may be mixed thereinto at a step of manufacturing the media such as the paper or the like.

The sheet member 30 in which a plurality of powder particles 11a of the RF powder 11 are made to be contained are scanned with the reader/writer 32 which is connected to a computer 31, and information included in each of the powder particles 11a is read. The computer 31 is provided with a display 31a, a main unit 31b, a keyboard 31c, or the like.

The above-described reader/writer 32 has a read terminal 33 (refer to FIG. 6) and reads information provided from each powder particle 11a using radio-frequency electromagnetic waves (RF) in a specific frequency band including 2.45 GHz by the read terminal 33. Frequencies used in each of the plurality of powder particles 11a are different from each other, and are, for example, 1.9 GHz, 2 GHz, 2.50 GHz, and 2.54 GHz. Hence, the reader/writer 32 is configured to read the electromagnetic waves of, for example, 1.9 to 2.54 GHz frequency band as the above-described specific frequency band at proper timing. In order to read information from each of the plurality of powder particles 11a in the sheet member 30 via the read terminal 33, the reader/writer 32 performs a scanning operation in a certain direction along the surface of the sheet member 30, and also changes the frequency used for transmission/reception within the specific frequency band.

Figure 6:
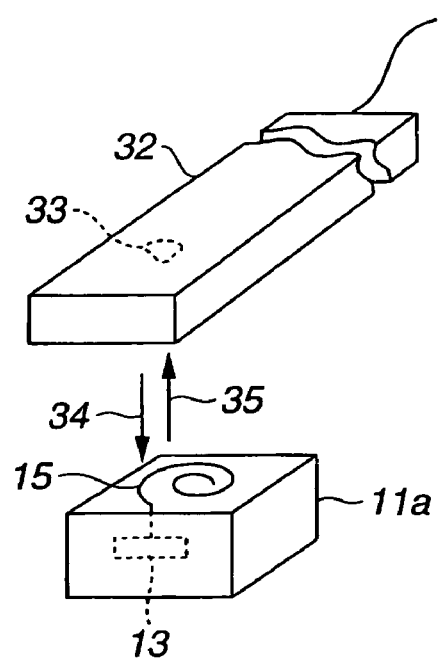
FIG. 6 is a view showing a transmission/reception relation of a radio-frequency electromagnetic wave with a reader/writer in an existence position of the single powder particle.

FIG. 6 shows a state where signals (information) are transmitted and received based on the radio-frequency electromagnetic wave given from the reader/writer 32 in an existence position of a certain powder particle 11a which is contained in the RE powder 11. Assuming that the read terminal 33 provided in a bottom surface of the reader/writer 32 performs a scanning operation by scanning movements of the reader/writer 32 and is located above the powder particle 11a of the RF powder 11. In this case, the read terminal 33 radiates the radio-frequency electromagnetic waves with several different frequencies, and when the electromagnetic wave with a frequency to which the powder particle 11a is responsive is radiated (an arrow 34 shown in FIG. 6), the powder particle 11a receives the radio-frequency electromagnetic wave, operates the integrated circuit 13 based on the energy thereof, and extracts information from the memory 26 to radiate it as the radio-frequency electromagnetic wave (an arrow 35 shown in FIG. 6). The electromagnetic wave radiated by the powder particle 11a is received by the read terminal 33 in the reader/writer 32. The read terminal 33 of the reader/writer 32 transmits the information received from the powder particle 11a to the computer 31, and the information provided from the powder particle 11a is memorized in the memory of the computer 31 in a position where there is the powder particle 11a.

Figure 5:
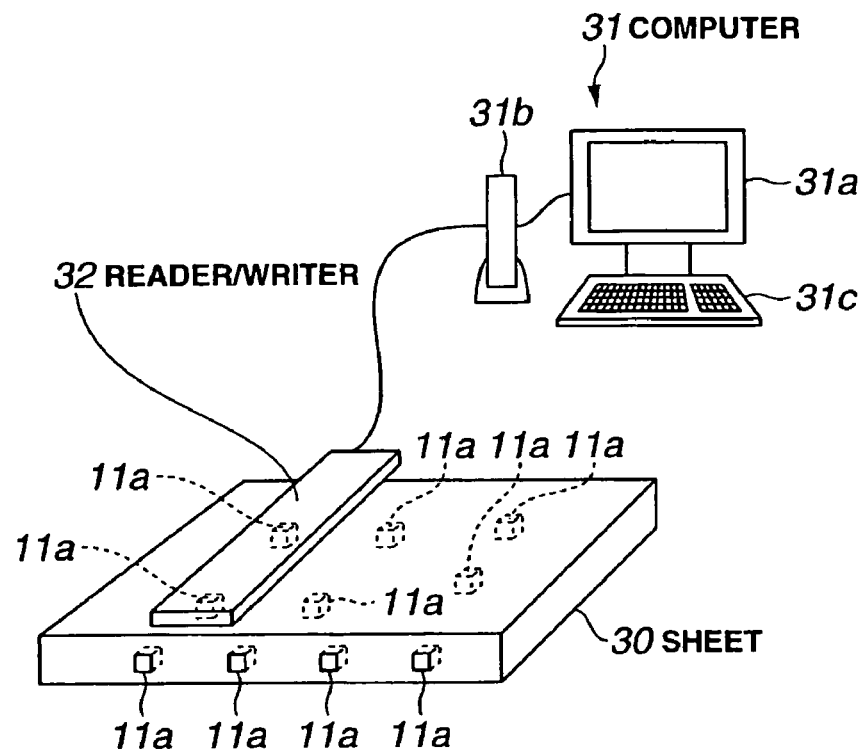
FIG. 5 is a device configuration illustrating an actual application of the RF powder according to the first embodiment.

By the reader/writer 32 scanning over the whole inside and surface of the sheet member 30 shown in FIG. 5, the information written in each of the RF powder 11 (a large number of powder particles 11a) which exist throughout a scanning area in the sheet member 30 is read and then memorized in the memory of the computer 31. The information memorized in the memory of the computer 31 is displayed on a display 31a thereof if needed.

Producing bills by making the above-described RF powder 11 to be contained in the bills using the above-described method, or making the RF powder 11 to be contained in important documents such as official documents, licenses, insurance cards, the other important cards, or the like makes it possible to utilize the RF powder 11 for forgery discrimination of the bills, authentication of the important documents, or the like. Additionally, since the RF powder 11 is used as the powder (powdery substance) of collectively utilizing a plurality or a large number of powder particles 11a instead of using it as a single IC tag chip in this case, the treatment is easy.

Next, with reference to FIGS. 7 and 8, a method for manufacturing the RF powder 11 according to the first embodiment will be explained.

Figure 7:
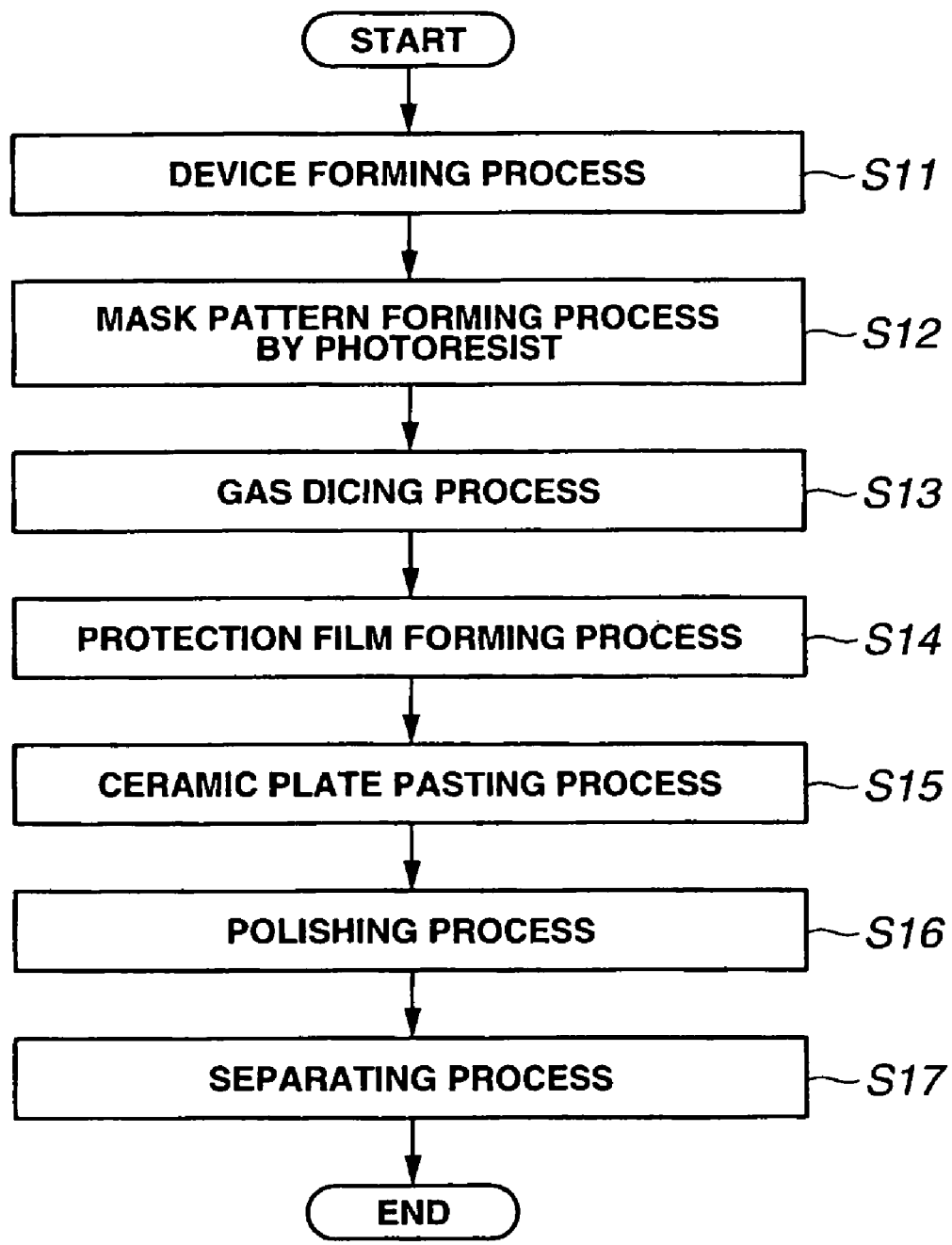
FIG. 7 is a flow chart showing a process of a method for manufacturing the RF powder according to the first embodiment of the present invention.
Figure 8:
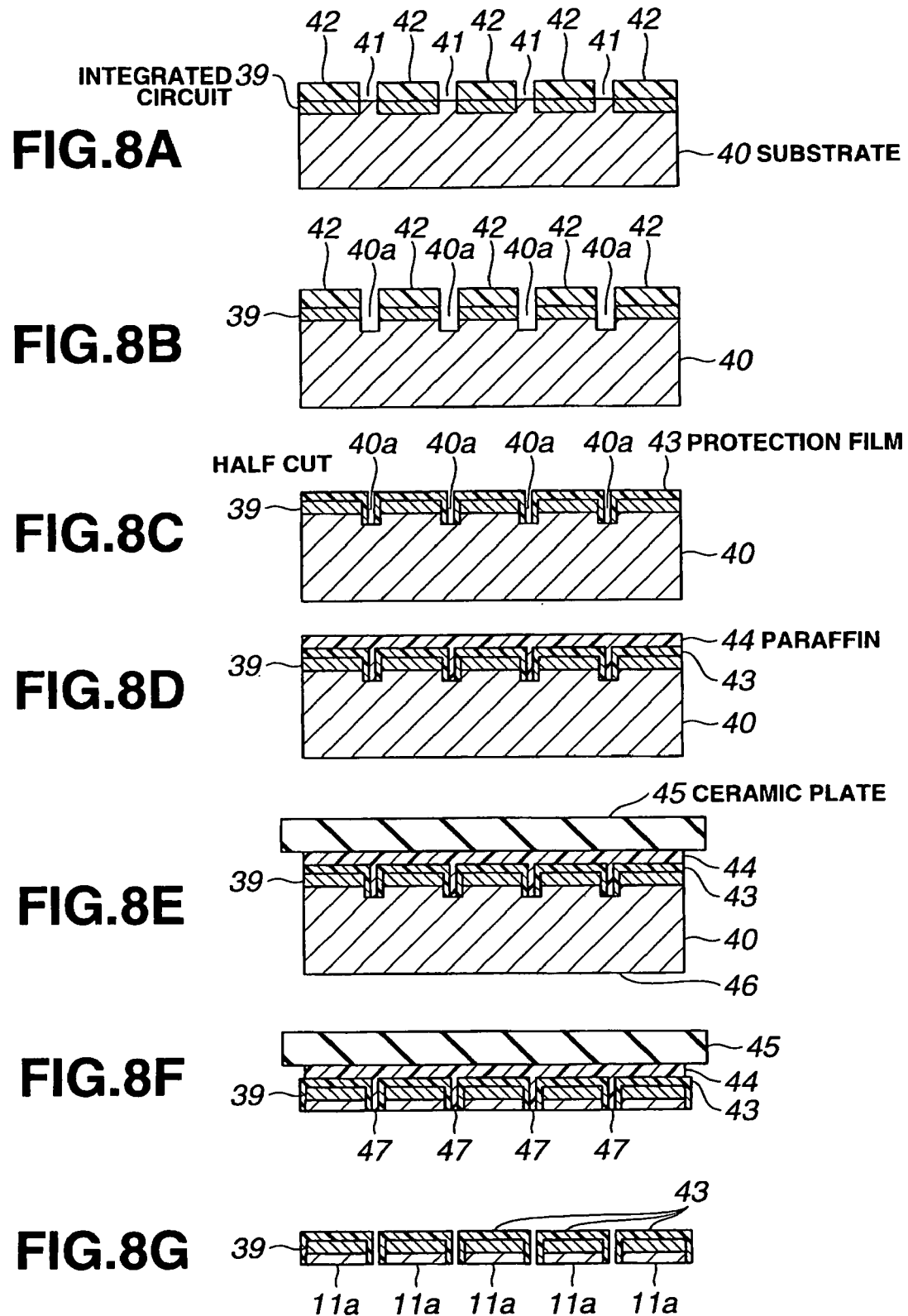
FIG. 8A-8G are sectional views showing configurations of a wafer and the powder particle corresponding to each process of the method for manufacturing the RF powder according to the first embodiment of the present invention.

FIG. 7 shows the whole process of manufacturing the RF powder 11, while FIG. 8 shows longitudinal sectional structures of the wafer or the powder particle 11a corresponding to each process.

The method for manufacturing the RF powder 11 includes a device forming process (step S11), a resist pattern forming process (step S12), a gas dicing process (step S13), a protection film forming process (step S14), a ceramic plate pasting process (step S15), a polishing process (step S16), and a separating process (step S17).

Each of the above-described processes S11 to S17 will be briefly explained. The device forming process S11 is a process of forming a large number of (a large quantity of) integrated circuit elements (39) with antenna on the wafer. The resist pattern forming process S12 is a process of forming resist patterns on the front surface of the wafer on which a large number of integrated circuit elements with antenna are formed. The gas dicing process S13 is a process of forming cut grooves using gas. The protection film forming process S14 is a process of forming the protection film for every integrated circuit element with antenna. The ceramic pasting process S15 is a process of pasting a strengthening plate such as a ceramic plate or the like, on the front surface of the wafer with adhesive such as paraffin, luster, or wax, which is dissolved in an organic solvent. The polishing process S16 is a process of polishing the back surface of the wafer until reaching bottoms of the above-described cut grooves. The separating process S17 is a process of dissolving the adhesive such as paraffin or the like in chemicals and then separating the integrated circuit elements with antenna, namely, the powder particles 11a, to thereby produce a large quantity of powder particles 11a. Hereinafter, each of above-described processes will be explained in more detail.

In the above-described device forming process S11, a large number of (a large quantity of) integrated circuits are formed on the front surface of the wafer composed of silicon or the like, using the front surface area except for dicing lines, an insulating film (oxide film or the like) is also formed with a thickness of approximately 30 micrometers on the front surface of the wafer on which the integrated circuits are formed, and antenna elements composed of inductors or the like are formed on the insulating film. The antenna element is formed corresponding to each integrated circuit, and the corresponding integrated circuit and antenna element are electrically connected with the embedded interconnection formed inside the insulator. The integrated circuit element with antenna described above is a semiconductor device composed of a set of integrated circuits, a set of antenna elements corresponding thereto, the interconnections, or the like. In FIG. 8, reference numeral 39 denotes the integrated circuit element with antenna. As exposure technologies used for forming a large number of micro integrated circuits on the front surface of the wafer and for forming the antenna elements on the insulator with a thickness of 30 micrometers further deposited on the front surface of the wafer, exposure technologies with parallel rays, or more preferably, exposure technologies with an X-ray is used in general. Irregularities are formed on the surface of the insulating film when the above-described insulating film is formed with a thickness of 30 micrometers, and thus transference cannot be performed by a common reduced projection light exposure technology with depth of focus, but using the exposure technology with the parallel rays (X-ray) makes it possible to correctly transfer a mask pattern to a resist for forming the antenna elements. As a result of this, the antenna elements can be formed correctly. The antenna elements are made of a copper material (copper plating). The above-described embedded interconnections formed inside the insulator are also made of a copper material.

Note that a large quantity of integrated circuits 39 with antenna formed on the wafer is of, for example, 3 million pieces for the 300-millimeter diameter wafer, while 1.4 million for the 200-millimeter diameter wafer.

Next, the mask pattern forming process S12 with the resist is performed (shown in FIG. 8(a)). A number of above-described integrated circuits are formed in an area near the front surface of a wafer 40 shown in FIG. 8(a) by the above-described device forming process S11, and the antenna elements are also formed corresponding to respective integrated circuits on the insulating film on the front surface of the wafer 40. On the wafer 40 on which a large number of integrated circuits and antenna elements are formed by the device forming process 311, resist mask patterns 42 are formed except for dicing lines 41 with a width of less than 50 micrometers, preferably in a range of approximately 10 to 30 micrometers by a lithography process. In FIG. 8(a), each of a plurality of resist mask patterns 42 corresponds to the set of integrated circuits, namely, the above-described integrated circuit elements 39 with antenna.

FIG. 8(b) shows a result of the gas dicing process S13 performed on the wafer 40. According to the gas dicing process S13, in the front surface of the wafer 40, deep etching is performed on the dicing lines 41 which are set based on the resist mask patterns 42 to a depth of 50 to 100 micrometers by plasma etching or the like. The gas dicing process S13 is performed to form grooves 40a, for example, to a depth of approximately two times or more of a long side of the integrated circuit element 39 with antenna without cutting or separating the wafer 40. Hereinafter, these grooves 40a will be called the "cut grooves." A number of rectangular-net-like cut grooves 40a for separating the integrated circuit elements 39 with antenna in the subsequent process are formed on the wafer 40 by the gas dicing process S13 as shown in FIG. 8(b).

In the subsequent protection film forming process 514, a protection film 43 such as a silicon nitride film (SiN) or the like is formed with a required thickness by plasma CVD (plasma chemical vapor deposition) on the front surface of the wafer 40 from which the above-described resist mask patterns 42 have been removed (shown in FIG. 8(c)). The protection film 43 is formed up to inner surfaces of the cut grooves 40a. Note that a process of removing the resist patterns 42 which precedes the protection film forming process S14 is omitted in FIG. 8.

Furthermore, in the subsequent ceramic plate pasting process S15, for example, paraffin 44 which acts as an adhesive and solidifying agent is coated on the front surface of the wafer (shown in FIG. 8(d)), and the wafer 40 is then pasted on a ceramic plate 45 which has a required strength (shown in FIG. 8(e)). As a desirable state, the whole inside of the above-described cut grooves 40a is filled with the paraffin 44 and all the cut grooves 40a are embedded with the paraffin 44. The paraffin 44 becomes solidified after cooling. An adhesive and solidifying material which is dissolved by an organic solvent can be used in general, instead of the above-described paraffin 44.

In the following polishing process S16, a back surface 46 of the wafer 40 is polished. In this polishing process S16, the back surface 46 of the wafer 40 is polished until the polishing reaches bottoms 47 of the cut grooves 40a formed on the front surface and the paraffin 44 in the bottoms 47 is exposed (shown in FIG. 8(f)). Mechanical polishing is typically used in this back surface polishing. The polishing process may be completed only by performing mechanical polishing. This is because even when the back surface 46 is polished to the bottoms of the cut grooves 40a, the above-described solidified paraffin 44 is embedded inside the cut grooves 40a, and thus problems such as cracks, chaps, or the like hardly occurs. It should be noted that the polishing method is not limited only to mechanical polishing but other etching, chemical mechanical polishing, or the like may also be used in the back surface polishing, and naturally, these various kinds of polishing may be combined.

In the last separating process S17, temperature is increased to dissolve the above-described paraffin 44 by chemicals. After the paraffin 44 is dissolved, the ceramic plate 45 is removed and then portions of the wafer 40 on which the integrated circuit elements 39 with antenna are formed are separated therefrom as the above-described powder particles 11a (shown in FIG. 8(g)). In this way, a large quantity of powder particles 11a are produced from one wafer 40. Each powder particle 11a has the integrated circuit element 39 with antenna composed of the integrated circuit, the antenna element, or the like, and this integrated circuit element 39 with antenna is further protected by the protection film 43.

As described above, the RF powder 11 according to the first embodiment illustrated in FIGS. 1 to 6 can be formed. According to this manufacturing method, since the protection film forming process S14 for covering with the protection film 43 the circumference of the integrated circuit elements 39 with antenna in the powder particle 11a is performed before separating the powder particles 11a, the protection film 43 can be uniformly attached to the integrated circuit element 39 with antenna provided in each powder particle 11a. Incidentally, while the mask pattern forming method by the resist is exemplified in the present embodiment, a mask pattern forming method by photosensitive polyimide or the like achieves a similar effect to that of the present embodiment.

Next, with reference to FIGS. 9 to 11, a second embodiment of the RF powder according to the present invention will be explained.

Figure 9:
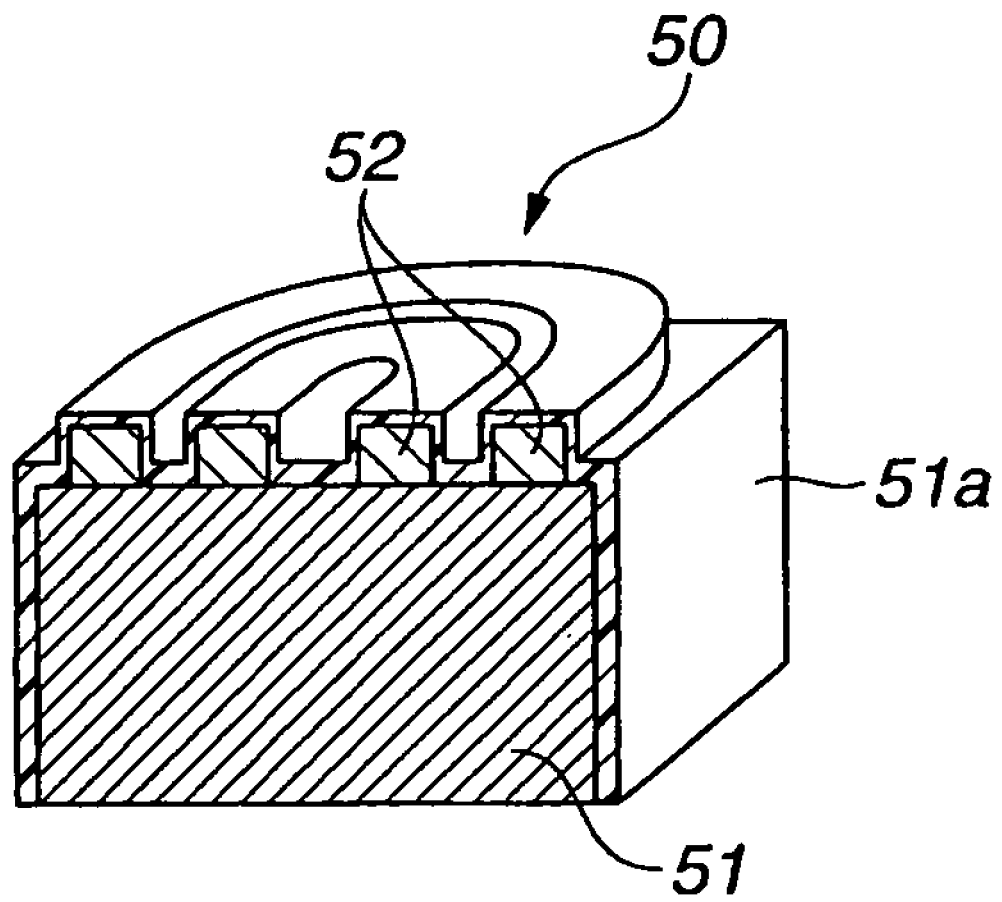
FIG. 9 is a perspective view showing a cross section of a part of a single powder particle of RF powder according to a second embodiment of the present invention.
Figure 10:
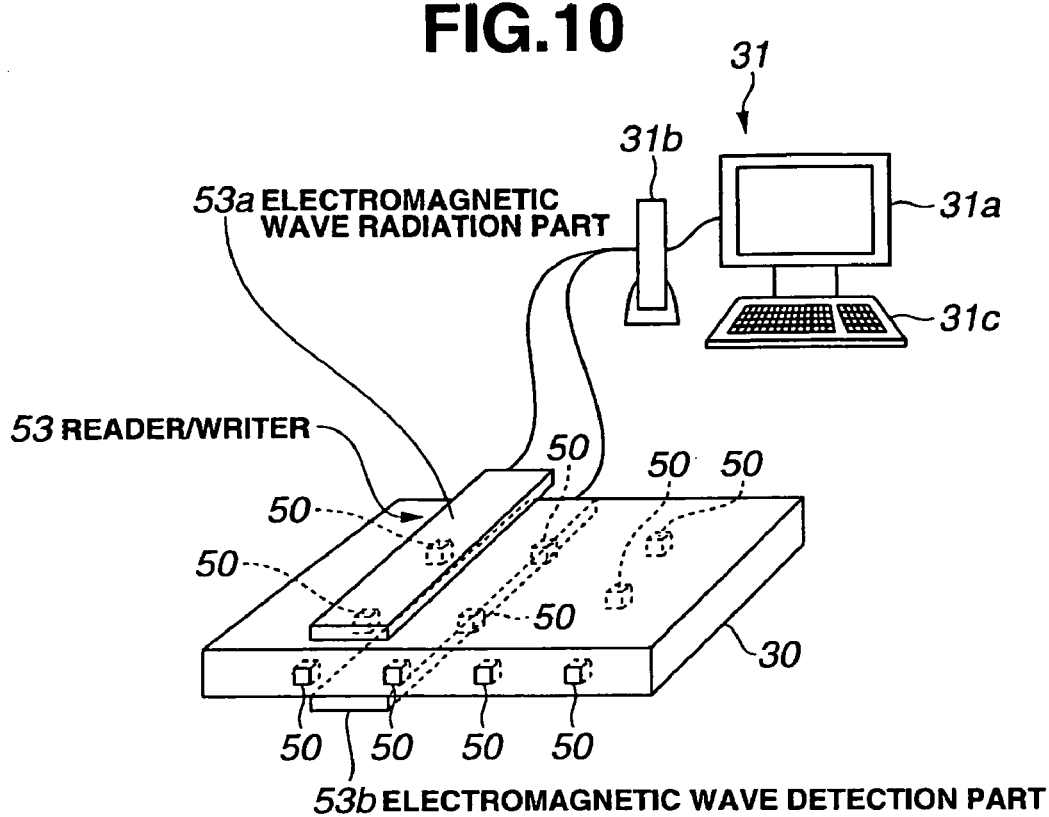
FIG. 10 is a view illustrating an actual application of the RF powder according to the second embodiment.
Figure 11:
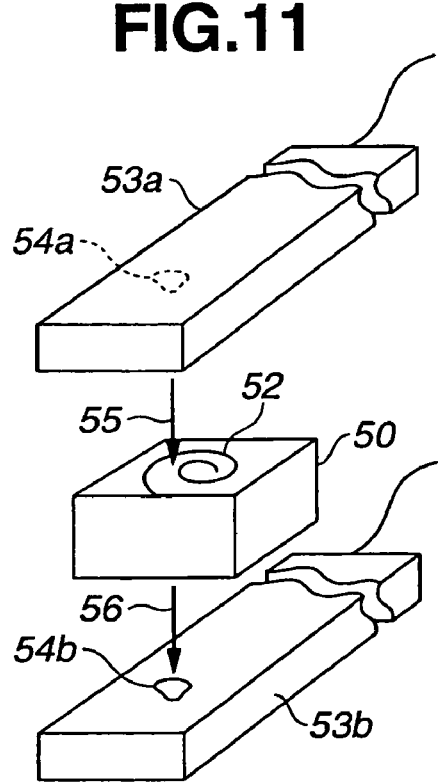
FIG. 11 is a view showing a transmission/reception relation of a radio-frequency electromagnetic wave with a reader/writer in an existence position of a single powder particle in the second embodiment.

In FIGS. 9 to 11, the same numerals are given to the same components as the components explained in the above-described first embodiment.

FIG. 9 is an external perspective view of a cross section of a part of a single powder particle 50. The powder particle 50 is the particle stored and managed in the container 1 as shown in FIG. 1, and is used in an aspect shown in FIG. 2. A size of the powder particle 50 is the same as the above-described powder particle 11a. The powder particle 50 has resonators 52 formed on a substrate 51 such as silicon or the like. The resonator 52 is formed with a capacitive element and an inductive element using the antenna and the insulator. Reference numeral 51a in the figure denotes a protection film such as SiN or the like. The resonator 52 has a function well responsive to a specific frequency, for example, the 2.45 GHz radio-frequency electromagnetic field. When the reader/writer is formed with an inductance element, a responsive frequency changes due to mutual inductance according to proximity. The reader/writer is designed in consideration of it. When the responsive frequency is fixed to a specific value, it is also possible to fix it more actively by the integrated circuit from a design point or view.

Next, with reference to FIGS. 10 and 11, an actual use example of the RF powder according to the second embodiment will be explained. FIG. 10 and FIG. 11 are figures similar to the above-described FIG. 5 and FIG. 6, respectively. A number of powder particles 50 of the RF powder according to the present embodiment are attached on the surface of the sheet member 30, or embedded thereinside in a manner similar to that of the first embodiment described above.

The sheet member 30 which contains a large number of powder particles 50 is read by a reader/writer 53 connected to the computer 31. The reader/writer 53 has an electromagnetic wave radiation part 53a and an electromagnetic wave detection part 53b. The electromagnetic wave radiation part 53a is arranged on the top of the sheet member 30, while the electromagnetic wave detection part 53b is arranged on the bottom of the sheet member 30. The electromagnetic wave radiation part 53a and the electromagnetic wave detection part 53b have a position relation of disposing the sheet member 30 therebetween, wherein they are located in the same positions of the upper and lower sides of the sheet member and are moved in a predetermined direction keeping the same position relation. Further, in the reader/writer 53, the electromagnetic wave radiation part 53a has an electromagnetic wave radiation terminal 54a, while the electromagnetic wave detection part 53b has an electromagnetic wave detection terminal 54b. The electromagnetic wave radiation terminal 54a of the electromagnetic wave radiation part 53a and the electromagnetic wave detection terminal 54b of the electromagnetic wave detection part 53b synchronously move along the front surface and the back surface of the sheet member 30 to thereby scan the sheet member 30. The reader/writer 53 performs a detecting operation at each scanning position using the above-described frequency included in the specific frequency band.

FIG. 11 shows a connection relation between the reader/writer 53 and the radio-frequency electromagnetic field in an existence position of a certain powder particle 50 contained in the RF powder according to the present embodiment. When the electromagnetic wave radiation terminal 54a of the electromagnetic wave radiation part 53a performs a scanning operation to reach a position above the powder particle 50, it changes the frequency to then radiate the radio-frequency electromagnetic field, and when the electromagnetic field with the frequency to which the powder particle 50 is responsive is radiated, the resonator 52 resonates in the powder particle 50, and electromagnetic field energy (an arrow 55) is absorbed in the powder particle 50. Further, in the powder particle 50, the electromagnetic wave detection terminal 54b of the electromagnetic wave detection part 53b detects an electromagnetic wave (an arrow 56) whose intensity is reduced due to the electromagnetic wave absorption. Information on the detected value detected by the electromagnetic wave detection part 53b is sent to the computer 31, and data on an absorption amount of the electromagnetic wave in the scanning position is memorized in a memory of the computer.

The reader/writer 53 scans over the whole sheet member 30 shown in FIG. 10, and thus the data on the amount of electromagnetic absorption by the RF powder (a large number of the powder particles 50) in the whole area of the sheet member 30 is memorized in the computer 31. The information memorized in the memory of the computer 31 is displayed on the display 31a thereof if needed.

The RF powder according to the second embodiment can be used for forgery discrimination of bills or authentication of important documents, or the like in a manner similar to that of the RF powder according to the first embodiment described above, In this case, since the RF powder is used as a powder, the treatment is easy.

Since the method for manufacturing the RF powder according to the second embodiment differs only in that the resonators are formed instead of forming the integrated circuit elements in the device forming process S11 in the method for manufacturing the RF powder 11 according to the first embodiment described above and the other processes are the same as those in the above-described first embodiment, explanations thereof will be omitted.

Configurations, shapes, sizes, and arrangement relations explained in the above embodiments are just schematically illustrated enough to understand and carry out the present invention, and values and compositions (materials) of each configuration are also only illustrations. Therefore, the present invention is not limited to the foregoing embodiments, but can be changed into various forms, without departing from the scope of technical ideas described in the claims.

INDUSTRIAL APPLICABILITY

The RF powder according to the present invention is applicable to powder components as information recording media used for authentication of documents, forgery discrimination of bills, or the like.

The invention claimed is:

1. An RF powder used in a form of powder, wherein each particle of the powder has an integrated circuit formed on a substrate, an insulating layer formed on the integrated circuit, and an antenna element formed on the insulating layer.

2. An RF powder used in a form of powder, wherein each particle of the powder has a resonator which is formed on a substrate and is responsive to an external electromagnetic field.

3. The RF powder according to claim 2, wherein the resonator is an antenna element formed on the substrate or an antenna element formed on an insulating layer on the substrate.

4. The RF powder according to any one of claims 1 to 3, wherein each particle of the powder is used to be mixed into a medium without inspection.

5. The RF powder according to any one of claims 1 to 3, wherein each particle of the powder is stored and managed in a container in a state of powder.

6. The RF powder according to claim 1 or 2, wherein each particle includes a longest side and wherein a size of a rectangular plane in each particle is not less than 0.05 millimeters square and not more than 0.30 millimeters square, wherein the rectangular plane includes the longest side in each particle.

7. The RF powder according to claim 6, wherein the size of the rectangular plane including the longest side is 0.15 millimeters square in the at least some of the particles.

* * * * *

UNITED STATES PATENT AND TRADEMARK OFFICE
CERTIFICATE OF CORRECTION

PATENT NO. : 8,188,924 B2
APPLICATION NO. : 12/153661
DATED : May 29, 2012
INVENTOR(S) : Furumura It is certified that error appears in the above-identified patent and that said Letters Patent is hereby corrected as shown below:

On the Face Page, in Field (56), under "OTHER PUBLICATIONS", in Column 2, Line 3, delete "Pllytronic," and insert -- Polytronic, --, therefor.

On Page 2, in Field (56), under "OTHER PUBLICATIONS", in Column 1, Line 7, delete "Frequncies," and insert -- Frequencies, --, therefor.

On Page 2, in Field (56), under "OTHER PUBLICATIONS", in Column 1, Line 8, delete "Microwane" and insert -- Microwave --, therefor.

In Column 2, Line 7, delete "2003-179005" and insert -- 2003-179005. --, therefor.

In Column 2, Line 9, delete "mitsuo" and insert -- Mitsuo --, therefor.

In Column 2, Line 10, delete "1183" and insert -- 1183. --, therefor.

In Column 2, Line 49, delete "sane." and insert -- same. --, therefor.

In Column 4, Line 50, delete "FIG." and insert -- FIGS. --, therefor.

In Column 7, Line 5, delete "RE" and insert -- RF --, therefor.

In Column 8, Line 64, delete "311," and insert -- S11, --, therefor.

In Column 9, Line 19, delete "514," and insert -- S14, --, therefor.

In Column 9, Line 32, delete "water" and insert -- wafer --, therefor.

Signed and Sealed this
Twentieth Day of November, 2012

David J. Kappos
*Director of the United States Patent and Trademark Office*

In Column 10, Line 41, delete "or" and insert -- of --, therefor.

In Column 12, Line 46, in Claim 7, delete "in the at least" and insert -- in at least --, therefor.